United States Patent
Comalander (10) Patent No.: US 10,724,656 B2
(45) Date of Patent: Jul. 28, 2020

(54) PIPE SUPPORT SYSTEM, AND METHOD OF USE

(71) Applicant: Comalander Fabrication and Services, LLC, Beaumont, TX (US)

(72) Inventor: Christopher R. Comalander, Beaumont, TX (US)

(73) Assignee: Comalander Fabrication and Services, LLC, Beaumont, TX (US)

( * ) Notice: Subject to any disclaimer, the term of this patent is extended or adjusted under 35 U.S.C. 154(b) by 0 days.

(21) Appl. No.: 16/389,972

(22) Filed: Apr. 21, 2019

(65) Prior Publication Data

US 2020/0018428 A1 Jan. 16, 2020

Related U.S. Application Data

(60) Provisional application No. 62/695,975, filed on Jul. 10, 2018, provisional application No. 62/780,977, filed on Dec. 18, 2018.

(51) Int. Cl.
| | |
|---|---|
| *F16L 3/18* | (2006.01) |
| *F16L 1/024* | (2006.01) |
| *B23K 37/053* | (2006.01) |
| *B65G 1/04* | (2006.01) |
| *F16L 3/02* | (2006.01) |
| *F16L 3/20* | (2006.01) |

(52) U.S. Cl.
CPC ............. *F16L 3/18* (2013.01); *B23K 37/053* (2013.01); *B65G 1/0442* (2013.01); *F16L 1/0243* (2013.01); *F16L 3/02* (2013.01); *F16L 3/20* (2013.01)

(58) Field of Classification Search
CPC ......... F16L 3/18; F16L 1/0246; B23K 37/053
See application file for complete search history.

(56) References Cited

U.S. PATENT DOCUMENTS

| | | | | |
|---|---|---|---|---|
| 1,097,273 | A * | 5/1914 | Tyler .................... | F16L 3/18 248/55 |
| 1,870,760 | A * | 8/1932 | Tipton ................. | B23K 37/053 254/126 |
| 2,500,204 | A * | 3/1950 | Bela ..................... | B23K 37/053 228/44.5 |
| 2,893,669 | A * | 7/1959 | Kindorf ................ | F16L 3/18 248/55 |
| 3,397,564 | A * | 8/1968 | Schroeder ........... | B21C 37/0807 72/113 |

(Continued)

OTHER PUBLICATIONS

Screen Shot of Grainger Pipe Support Block; Accessed Mar. 2019; https://www.grainger.com/product/15E509?cm_sp=Product_Details-_-Products_Based_on_Your_Search-_-IDPPLARECS&cm_vc=IDPPLARECS.

(Continued)

*Primary Examiner* — Bradley Duckworth
(74) *Attorney, Agent, or Firm* — Peter L. Brewer; Thrive IP (57) ABSTRACT

A pipe support system. The pipe support system comprises a first wedge block and a second opposing wedge block. Each of the blocks comprises a base having walls. In addition, each of the blocks supports an angled roller bearing. The roller bearings are configured to support a joint or section of pipe along an outer diameter of the pipe. Beneficially, the distance or spacing between the wedge blocks may be adjusted by an operator to accommodate sections of pipe having different diameters. A method for supporting a section of pipe is also provided.

30 Claims, 6 Drawing Sheets

(56) References Cited

U.S. PATENT DOCUMENTS

| | | | | | |
|---|---|---|---|---|---|
| 3,769,190 | A | * | 10/1973 | Deem, Jr. | C23F 13/02 204/196.15 |
| 5,028,149 | A | * | 7/1991 | Hardtke | B65G 39/12 138/107 |
| 5,163,642 | A | * | 11/1992 | Torrens | F16L 3/00 248/49 |
| 5,934,626 | A | * | 8/1999 | Collins, Jr. | B23K 37/0538 248/132 |
| 6,592,093 | B2 | * | 7/2003 | Valentz | F16L 3/00 248/346.01 |
| 7,090,173 | B2 | | 8/2006 | Lussier | |
| 8,807,492 | B2 | | 8/2014 | Lake | |
| 9,447,900 | B2 | * | 9/2016 | Birch | F16C 13/04 |
| 10,221,968 | B2 | | 3/2019 | Haynes et al. | |
| 10,247,330 | B2 | * | 4/2019 | Hargrave | F16L 3/1058 |
| 10,274,111 | B2 | | 4/2019 | Breda | |
| 10,279,437 | B2 | * | 5/2019 | Velez | B23K 37/053 |
| 2006/0115189 | A1 | * | 6/2006 | Koch | F16L 3/16 384/50 |
| 2018/0112802 | A1 | * | 4/2018 | Guerra | E21B 7/28 |
| 2018/0277285 | A1 | | 9/2018 | Stilwell et al. | |

OTHER PUBLICATIONS

Screen Shot of Ancorage Group Pipe Cradle; Accessed Mar. 2019; https://zipleaf.auz.net/Companies/Anchorage-Group-Pipe-Supports/Article-Piping-Cradles.

Screen Shot of EZ Line Pipe Clamp Shim Block Assy; Accessed Mar. 2019; http://www.ezline.com/ezline-pipe-clamps-and-shim-block-assemblies/.

Screen Shot of Precision Weld and Fabrication Shim Blocks; Accessed Mar. 2019; http://weweld.com/pipe-clamps/.

Screen Shot of PPSC Shim Block with Strap; Accessed Mar. 2019; https://www.pipelinepsc.com/gsh-shim-block-with-strap.

Screen Shot of Refurbished 5-Ton, 4-48" Od Pipe Roller Supports; Accessed May 2019; Date of publication unknown; https://www.ljwelding.com.

Screen Shot of Pipe Roll Stand; Accessed May 2019; Date of publication unknown; https://www.zoro.com.

* cited by examiner

PIPE SUPPORT SYSTEM, AND METHOD OF USE

CROSS REFERENCE TO RELATED APPLICATIONS

This application claims the benefit of U.S. Ser. No. 62/695,975 filed Jul. 10, 2018. That application is entitled "Pipe Support System and Method of Use." This application is incorporated herein in its entirety by reference.

The application also claims the benefit of U.S. Ser. No. 62/780,977 filed Dec. 18, 2018. That application is also entitled "Pipe Support System and Method of Use." This application is also incorporated herein in its entirety by reference.

STATEMENT REGARDING FEDERALLY SPONSORED RESEARCH OR DEVELOPMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present invention relates generally to pipe support structures for holding joints of pipe or sections of pipeline above a ground surface. More specifically, the invention relates to a pipe support system that is adjustable so as to accommodate pipe joints having varied outer diameters.

Technology in the Field of the Invention

Pipeline transport involves the transportation of fluids. Such fluids may include brine, potable water or sewage. Such fluids may also include liquid hydrocarbons, hydrocarbons in gaseous state, refined hydrocarbons, or components separated from produced hydrocarbons such as sulfuric components and carbon dioxide.

Pipelines are made up of a series of pipe joints connected end to end. In many cases, pipelines are installed above ground. Such elevated pipelines are frequently supported by a series of stanchions (also known as pipe support stands) that are spaced apart along a length of the pipeline. These stanchions rise from the ground to support the pipeline a predetermined distance above the ground.

During use, the pipe joints along a pipeline will experience fluctuations in temperature. This is due to a combination of changes in ambient outdoor temperature and changes in the temperature of the fluids being transported. Temperature fluctuations will inevitably cause portions of the pipeline to expand and contract. Some temperature fluctuations will occur abruptly, for example, over a matter of hours. This may occur due to short term changes in weather or due to the 24-hour solar cycle. Other changes may occur over longer periods of time, for example, due to changes in season or changes in fluid composition.

As a practical matter, the temperature fluctuations experienced along a pipeline are non-uniform across the length of the pipeline. This leads to a situation where some portions of the pipeline will expand or contract to a greater degree than other portions. The effects of thermal expansion and contraction on a pipeline will often be most pronounced along sections of pipe that periodically flow relatively hot or cold fluids.

Thermal expansion and contraction causes a pipeline to extend or retract in axial length. This, in turn, causes frictional wear as the pipeline rubs against the pipe support structure. Pipeline stanchions may incorporate bearing surfaces that permit the overlying pipeline to slide relative to the stanchion. Beneficially, this can reduce the occurrence of bending, buckling, and jumping caused by an expanding or contracting pipe. For example, a pair of aluminum or polished stainless steel plates may be welded to the bottom of a pipe shoe and the top of a pipe stanchion, to face one another during use and to permit 360 degrees of relative movement between the stanchion and pipeline. In other examples, one of the plates may be replaced with a or ceramic or a polytetrafluoroethylene (PTFE) plate.

In any instance, it is necessary to monitor the condition of pipe support structures to ensure that the bearing surfaces are in good condition not only to support a pipe section but also to accommodate thermal expansion/contraction. Unfortunately, replacing bearing plates is time consuming and expensive. Further, each pipeline will require unique bearing plates, depending on pipe size. In this respect, one of the problems commonly associated with pipe support structures is that each support is typically made for a specifically sized pipe, thereby limiting the use.

Therefore, a need exists for an improved pipe support system for holding a pipe above a ground surface, wherein a roller bearing is provided to accommodate axial pipe movement in response to thermal expansion and contraction. A need further exists for a pipe support system that may be adjusted so as to accommodate pipe joints or sections of a pipeline having varied outer diameters. Still further, a need exists for a method of accurately spacing opposing roller bearings in order to support a joint of pipe at tangent lines.

BRIEF SUMMARY OF THE INVENTION

A pipe support system is first provided herein. In one aspect, the pipe support system comprises a first wedge block and a second wedge block. Each of the first and second wedge blocks comprises a base. The base has an inside wall, an outside wall, and an angled face extending there between. Of note, the outside wall is taller than the inside wall such that the angled faces face each other.

The bases of the first and second wedge blocks each includes a pair of through-openings. The respective through-openings are aligned.

As part of the angled face for each of the first and second wedge blocks, an upper support and a lower support are provided. The upper and lower supports extend up from the angled face. An opening is preserved within each of the upper and lower supports to receive a pin.

Each of the first and second wedge blocks also includes a roller bearing. Each roller bearing is disposed along a respective angled face and receives a pin. Each pin supports its roller bearing at an angle of between 20° and 40°. Each of the first and second roller bearings is preferably fabricated from a non-conductive material.

The pipe support system also comprises a threaded bar. The threaded bar is configured to extend through the aligned through-openings in each of the first wedge block and the second wedge block. Rotation of the threaded bar in a first direction will draw the first and second wedge blocks and respective roller bearings inward towards each. Reciprocally, rotation of the threaded bar in a second opposite direction will allow the first and second wedge blocks and respective roller bearings to be slidably moved outward from each other.

Using the threaded bar, the roller bearings are adjustably spaced apart in order to support a joint or section of pipe along an outer diameter of the pipe. In a preferred embodiment, the pipe support system further comprises a spacer bar. The spacer bar is configured to engage the inside wall of each of the first wedge block and the second wedge block as the threaded bar is rotated to draw the first and second wedge blocks inward towards each other. In this way, spacing of the first wedge block and the second wedge block is provided according to a length of the spacer bar. In one aspect, a length of the spacer bar is tuned such that when the inside wall of each of the first wedge block and the second wedge block engages a respective end of the space bar, each roller bearing will engage the outer diameter of a supported pipe along a tangent line.

In one aspect, the spacer bar defines a cyclindrical body having an inner diameter. The spacer bar resides around the threaded bar between the first wedge block and the second wedge block. Stated another way, the threaded bar extends through the inner diameter of the spacer bar.

In one embodiment, the pipe support system comprises a plurality of spacer bars, with each spacer bars having a different length. Each spacer bar is configured to engage the inside wall of each of the first wedge block and the second wedge block to provide a selected spacing. This accommodates pipe joints having different outer diameters.

In one aspect, the pipe support system further comprises a base plate. The base plate supports a first anchor and a second opposing anchor. The first anchor is secured to the base plate at a first location while the second anchor is secured to the base plate at a second location. Each anchor has an end plate comprising a through-opening, wherein each of the through-openings is dimensioned to receive a first end of the threaded bar. In this instance, the through-openings of the first and second wedge blocks and the through-openings of the first and second anchors are aligned and hold the threaded bar.

The end plate of the first anchor engages the outside wall of the first wedge block as a stop. Similarly, the end plate of the second anchor engages the outside wall of the second wedge block as a stop. These "stops" limit the ultimate movement of the first and second wedge blocks away from each other when the threaded bar is placed within the through-openings of the first and second anchors.

A method of supporting a section of pipe is also provided herein. In one embodiment, the method first comprises providing a pipe support system. The pipe support system may be in accordance with the pipe support system described above in its various embodiments. For example, the pipe support system may include:

- a first wedge block and a second wedge block, wherein each of the first and second wedge blocks comprises a base having an inside wall, an outside wall, and an angled face extending there between, wherein the outside wall is taller than the inside wall; and
- a roller bearing disposed along the angled face of each of the first and second wedge blocks, each roller bearing being oriented at an angle of between 20° and 40°.

The method also includes determining a spacing between the first wedge block and the second wedge block needed to support a joint or section of pipe. This determination is based upon the outer diameter of the pipe to be supported.

The method further includes rotating the threaded bar in order to provide for the determined spacing. The threaded bar may be rotated in a first direction to draw the first and second wedge blocks inward towards each other, and may be rotated in a second opposite direction to allow the first and second wedge blocks to be moved outward from each other. In one aspect, rotating the threaded bar comprises rotating a nut located at an end of the threaded bar relative to the threaded bar.

The method then includes placing the joint or section of pipe onto the pipe support system, thereby supporting the pipe above a ground surface.

In a preferred embodiment, the method further comprises selecting a spacer bar of a desired length. The spacer bar defines a cyclindrical body having an inner diameter. The spacer bar resides around the threaded bar between the first wedge block and the second wedge block.

The spacer bar is configured to engage the inside wall of each of the first wedge block and the second wedge block as the threaded bar is rotated to draw the first and second wedge blocks and respective roller bearings inward towards each other. In this way, the first wedge block and the second wedge block may be spaced apart according to the length of the selected spacer bar. Preferably, the length of the spacer bar is tuned such that when the inside wall of each of the first wedge block and the second wedge block engages a respective end of the space bar, each roller bearing engages the outer diameter of the supported pipe along a tangent line.

In one embodiment, the method includes providing a plurality of the spacer bars, wherein the spacer bars have different lengths. Once again, a length of each of the plurality of spacer bars is tuned such that when the inside wall of each of the first wedge block and the second wedge block engages a respective end of the space bar, each roller bearing engages the outer diameter of the supported pipe along a tangent line. By providing several spacer bars, the operator may adjust the wedge block spacing according to the diameter of the supported pipe.

DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF SELECTED
SPECIFIC EMBODIMENTS

Figure 1A:
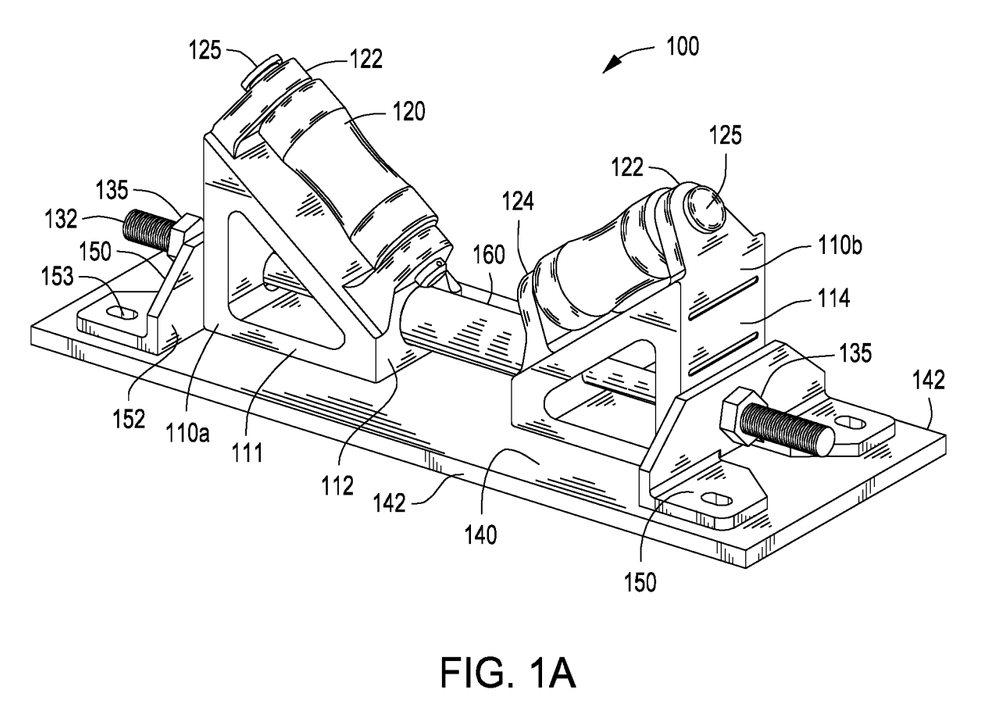
FIG. 1A is a perspective view of the pipe support system of the present invention, in one embodiment.
Figure 1B:
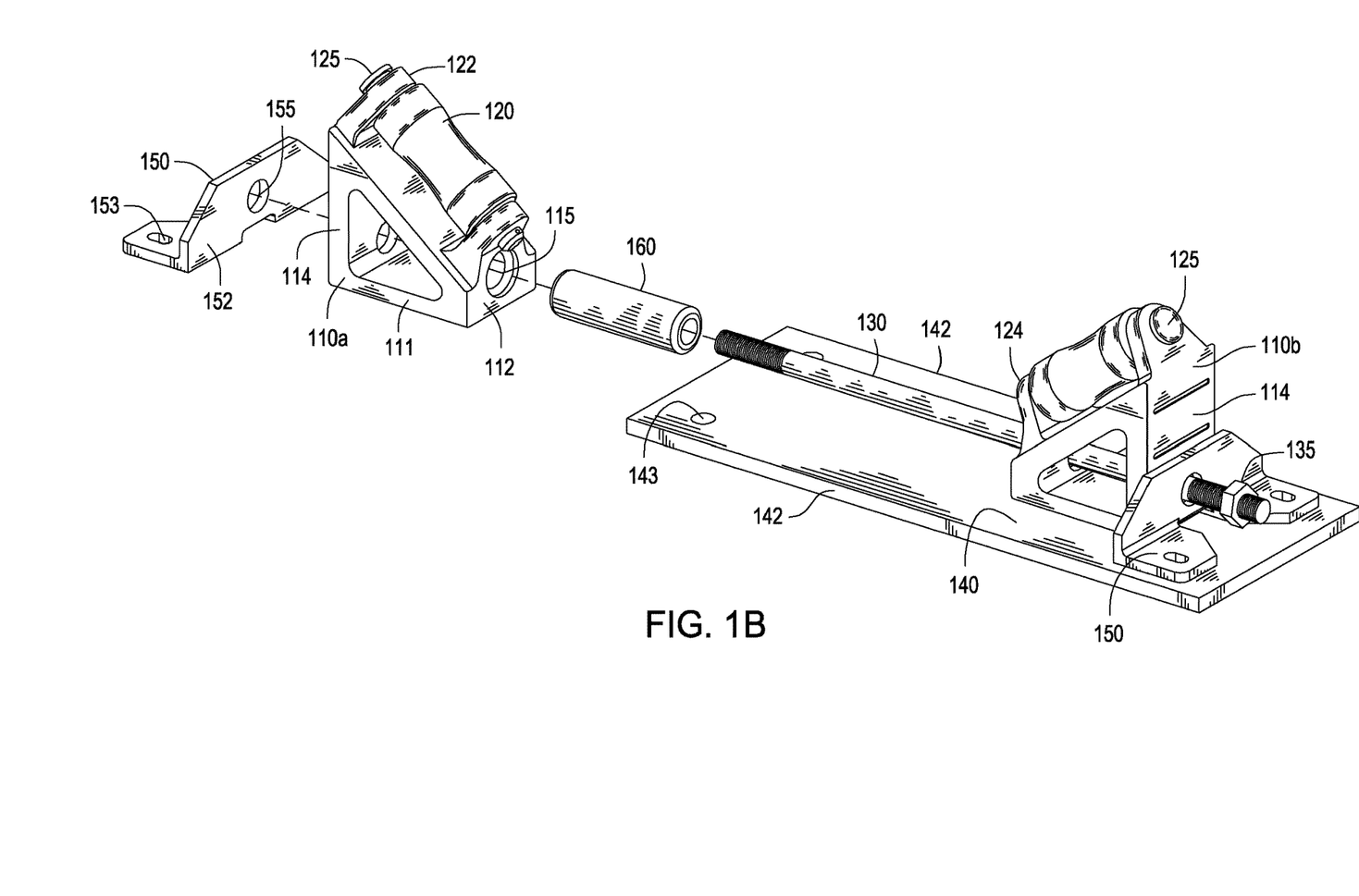
FIG. 1B is another perspective view of the pipe support system. Here, parts of the pipe support system are shown in exploded-apart relation.

The novel features believed characteristic of the embodiments of the present application are set forth in the appended claims. However, the embodiments themselves and further objectives and advantages thereof, will best be understood by reference to the following detailed description when read in conjunction with the accompanying drawings, wherein:

FIG. 1A is a perspective view of the pipe support system 100 of the present invention, in one embodiment. FIG. 1B is another perspective view of the pipe support system 100. Here, parts of the pipe support system 100 are shown in exploded-apart relation for illustrative purposes. The pipe support system 100 will be generally described with reference to FIGS. 1A and 1B together.

The pipe support system 100 first includes a pair of wedge blocks. These are denoted as a first wedge block 110a and a second wedge block 110b. Each wedge block 110 has a base 111. In addition, each wedge block 110 includes an inside wall 112 and an outside wall 114. The outside wall 114 extends higher from the base 111 than the inside wall 112.

Figure 3A:
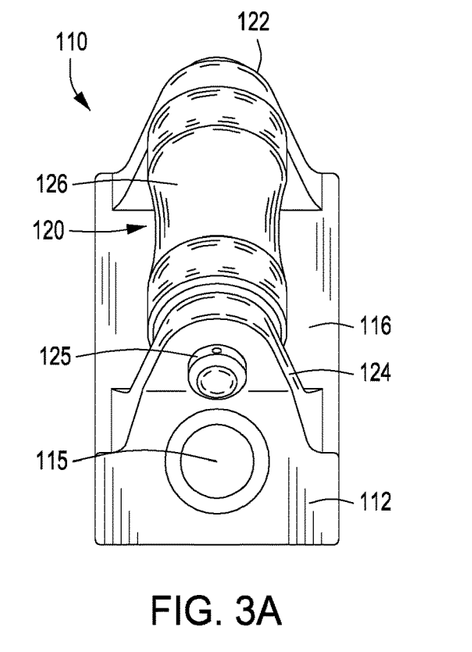
FIG. 3A is a front view of a wedge block as may be used in connection with the pipe support system of FIGS. 1A and 1B.

Each wedge block 110 has an angled top surface, or face 116 (seen in FIG. 3A). The faces 116 slope inwardly from a top of the outside wall 114 to a top of the inside wall 112.

The pipe support system 100 also includes a pair of roller bearings 120. Each roller bearing 120 is an elongated bearing that is supported above a respective face 116. Preferably, the roller bearings 120 are positioned at an angle of between 20° and 40°. More preferably, the angle is about 30° and forms a tangent line at the pipe surface.

In a preferred arrangement, the roller bearings 120 are fabricated from a polycarbonate material, polyurethane or a synthetic thermoplastic linear polyamide (or nylon). Nylon is preferred as it offers a combination of high strength and relatively low friction. One suitable example of a nylon material is Nylatron® GSM, available from Quadrant EPP USA Inc. of Reading, Pa. Nylatron® GSM contains finely divided particles of molybdenum disulphide ($MoS_2$) to enhance load bearing capabilities while maintaining the impact resistance inherent to nylon. Other Nylatron® products may also be considered. However, it is preferred that whatever plastic or other material is used, it should preferably have UV stabilizers.

A pin 125 is provided for each roller bearing 120. The pin 125 extends through the length of each roller bearing 120. Stated another way, the pins 125 are placed through an opening along a longitudinal axis of the roller bearings 120. The roller bearings 120 are configured to rotate about the pins 125.

The pins 125 are supported above the angled faces 116 by means of supports. Specifically, an upper support 122 and a lower support 124 are provided. Preferably, the supports 122, 124, the pins 125 and the bases 111 are all fabricated from a metal material for strength in view of the weight of the pipe joints to be supported.

The pins 125 allow the roller bearings 120 to rotate, thereby in turn allowing the pipe 200 to travel back and forth during thermal expansion and contraction without exerting any load on the foundation or frame. The pins 125 also allow the roller bearings 120 to be easily removed from the wedge blocks 110a, 110b for inspection purposes.

Each of the first and second wedge blocks 110 also includes a pair of through-openings 115. One through-opening is along the inside wall 112 while the other is along the outside wall 114. The through-openings 115 are aligned.

In addition, the pipe support system 100 includes a threaded bar 130. The threaded bar 130 comprises opposing threaded ends 132. In one aspect, the bar 130 is a so-called all-thread. The threaded bar 130 is configured to extend through the aligned through-openings 115 in each of the first wedge block 110a and the second wedge block 110b. The pipe support system 100 is configured such that a rotation of the threaded bar 130 in a first direction will draw the wedge blocks 110 inward towards each other, while rotation of the threaded bar 130 in a second opposite direction will allow the wedge blocks 110 to be moved outward from each other.

The threaded ends 132 are configured to receive a nut 135. Each nut 135 may be tightened down against the outside wall 114 of the wedge blocks 110a, 110b in order to adjust the spacing. In addition, a second nut 135 may be placed along each threaded bar 130 to abut an inside wall 112. Such a second nut 135 is depicted in the end view of FIG. 2, discussed below.

The operator may rotate the threaded bars 130 (relative to the nuts 135 or, alternatively, relative to threads in the through-openings 115) in a first direction in order to draw the wedge blocks 110 inward, or rotate the threaded bars 130 the opposite direction to move the wedge blocks 110 outward. It is understood here that the term "rotate" includes relative rotation such as rotating the nuts 135 to provide part of the spacing adjustments.

FIG. 1A and FIG. 1B also each show a spacer bar 160. The spacer bar 160 is dimensioned to receive the threaded bar 130 between the first 110a and second 110b wedge blocks. The spacer bar 160 is discussed more fully below in connection with the spacer bar 600 shown in FIG. 6.

Figure 2:
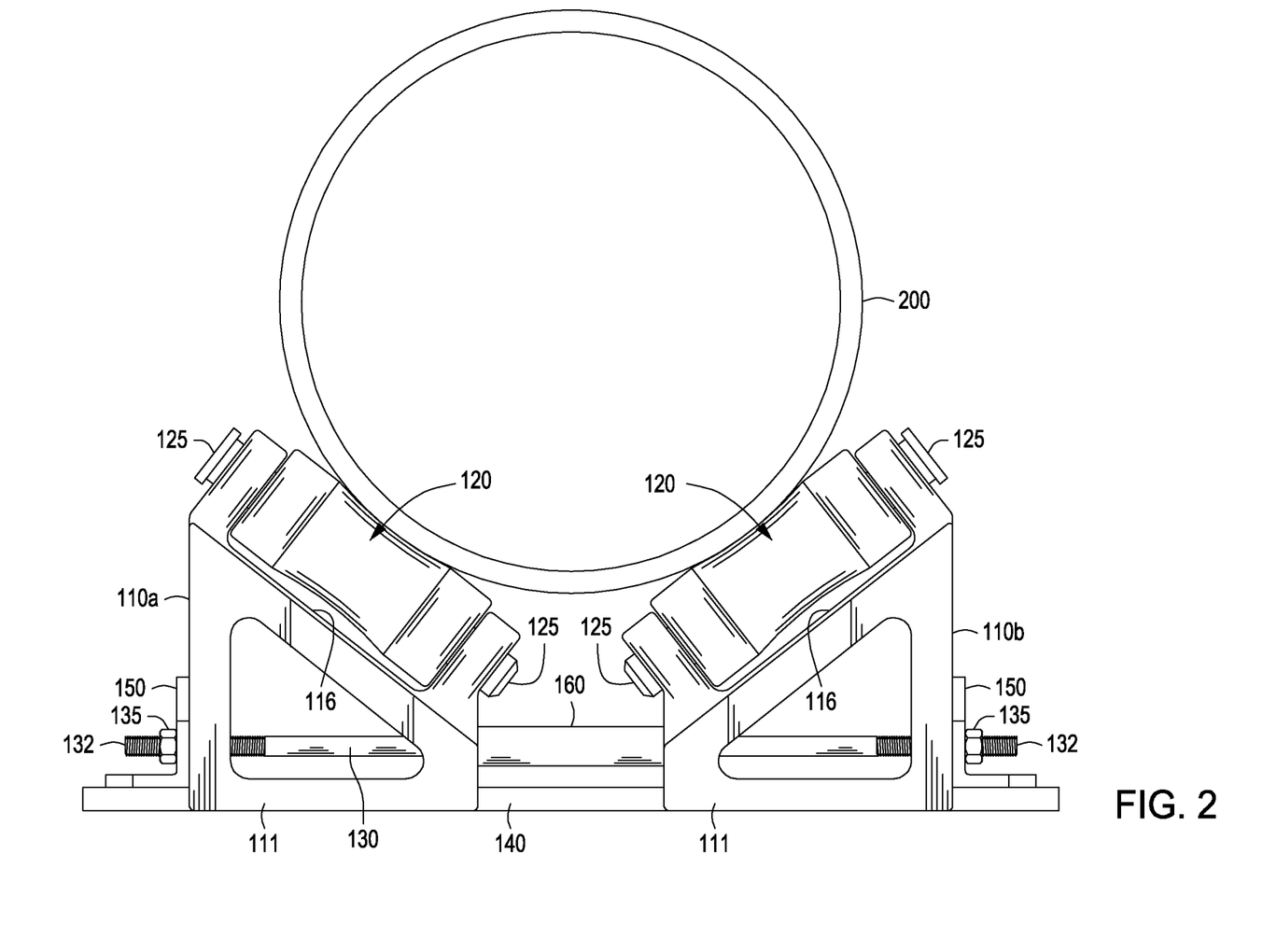
FIG. 2 is an end view of the pipe support system of FIG. 1A.

FIG. 2 is an end view of the pipe support system 100 of FIG. 1A. In this view, a pipe 200 has been set upon the two opposing wedge blocks 110a, 110b. The wedge blocks 110a, 110b are spaced apart in order to accommodate the outer diameter of the pipe 200 The wedge blocks 110 are moved closer to each other until a concave portion (shown at 126 in FIG. 4) of the roller bearing 120 engages the pipe 200.

It is understood that the present inventions are not limited by the type of pipe employed. The pipe 200 may be part of a pipeline used to convey fluids such as produced water, crude oil, brine, potable water, sewage or hydrocarbon gases. Produced hydrocarbons may be transported from the field into a gathering facility, a treatment facility or a refinery using the pipe 200. Processed fluids may be transported from a treatment facility or a refinery using the pipe 200.

In any instance, the pipe support system 100 may also include an optional base plate 140. In the arrangement of FIGS. 1A, 1B and 2, the base plate 140 represents a rectangular plate. Preferably, the plate 140 is fabricated from steel although it could also be a concrete pad or other sturdy foundational material. Optionally, the base plate 140 may be secured to a concrete structure using anchors (not shown).

The plate 140 includes opposing edges 142. The edges 142 are linear and are parallel to one another. The wedge blocks 110 and supported pipe 200 are configured to rest on the base plate 140. This provides stability to the pipeline.

To provide further stability to the pipeline, it is desirable to limit movement of the wedge blocks 110a, 110b on the base plate 140. For this, a pair of anchors 150 is provided. A first anchor 150 is secured to the base plate 140 at a first location while a second anchor 150 is secured to the base plate 140 at a second opposing location. This may be done using bolts 156.

Each anchor 150 includes an end plate 152. Each end plate 152, in turn, comprises a through-opening 155. The through-openings 155 are dimensioned to receive a respective end 132 of the threaded bar 130. The end plate 152 of the first anchor 150 engages the outside wall 114 of the first wedge block 110a as stop. Similarly, the end plate 152 of the second anchor 150 engages the outside wall 114 of the second wedge block 110b as a stop. Together, the two stops limit the ultimate outward movement of the first 110a and second 110b wedge blocks away from each other when the threaded bar 130 is in place within the through-openings 155 of the first and second anchors 150. This prevents the pipe support structure 100 from moving.

Figure 3B:
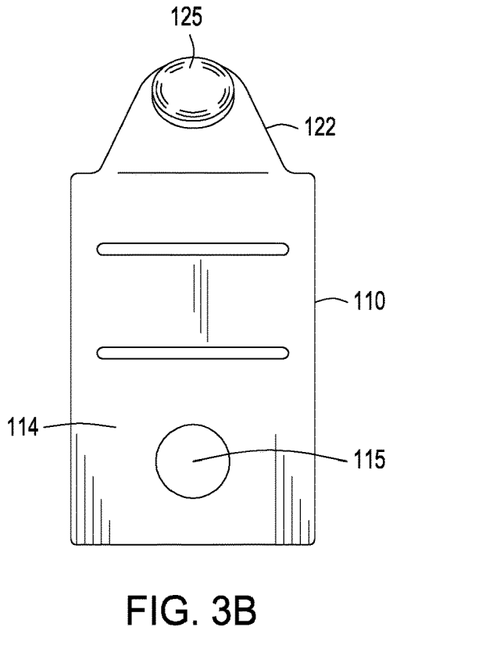
FIG. 3B is a back view of the wedge block of FIG. 3A.

FIG. 3A is a front view of a wedge block 110 as may be used in connection with the pipe support system 110. The wedge block is in accordance with the wedge blocks 110a and 110b of FIGS. 1A and 1B. FIG. 3B is a back view of the wedge block 110. In FIGS. 3A and 3B, the inside wall 112 and the outside wall 114 of the wedge block 110 are more clearly seen. In addition, the through-openings 115 are readily seen.

Figure 4:
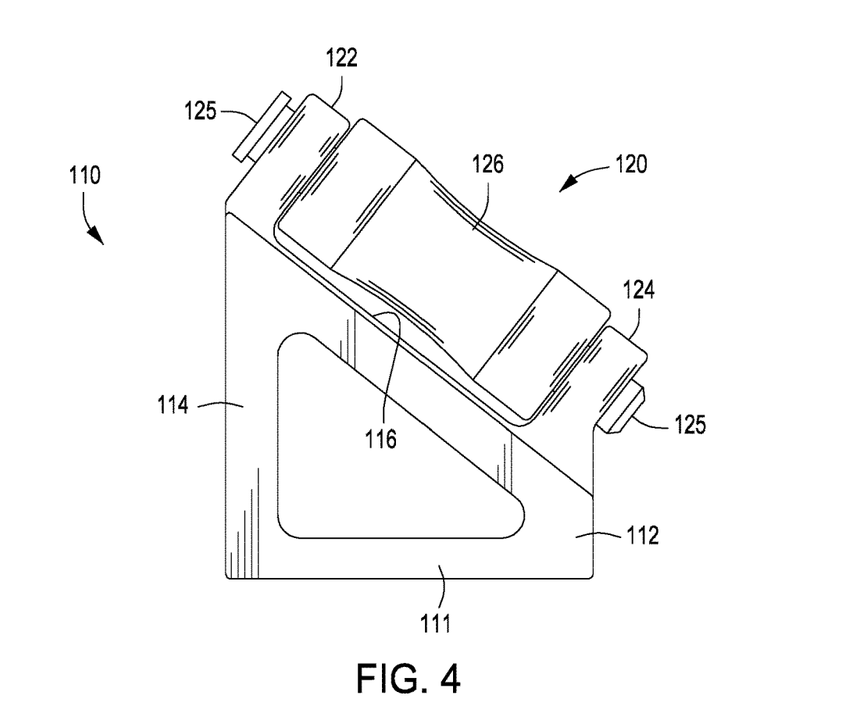
FIG. 4 is a side view of the wedge block of FIGS. 3A and 3B.

FIG. 4 is a side view of the wedge block 110 of FIGS. 3A and 3B. In this view, the inside wall 112 and the taller outside wall 114 are again seen as part of the base 111. In addition, the upper 122 and lower 124 supports are more clearly visible. The pin 125 is also indicated extending through the upper 122 and lower 124 supports.

It is also noted from FIG. 4 that the bearing 120 is supported by the pin 125 and the upper 122 and lower 124 supports over the angled face 116. A narrow gap is preserved between the roller bearing 120 and the angled face 116. It is further observed that the bearing 120 has an intermediate concave portion 126. In one aspect, the concave portion 126 serves as the point of contact with the outer diameter of the pipe 200.

Figure 5:
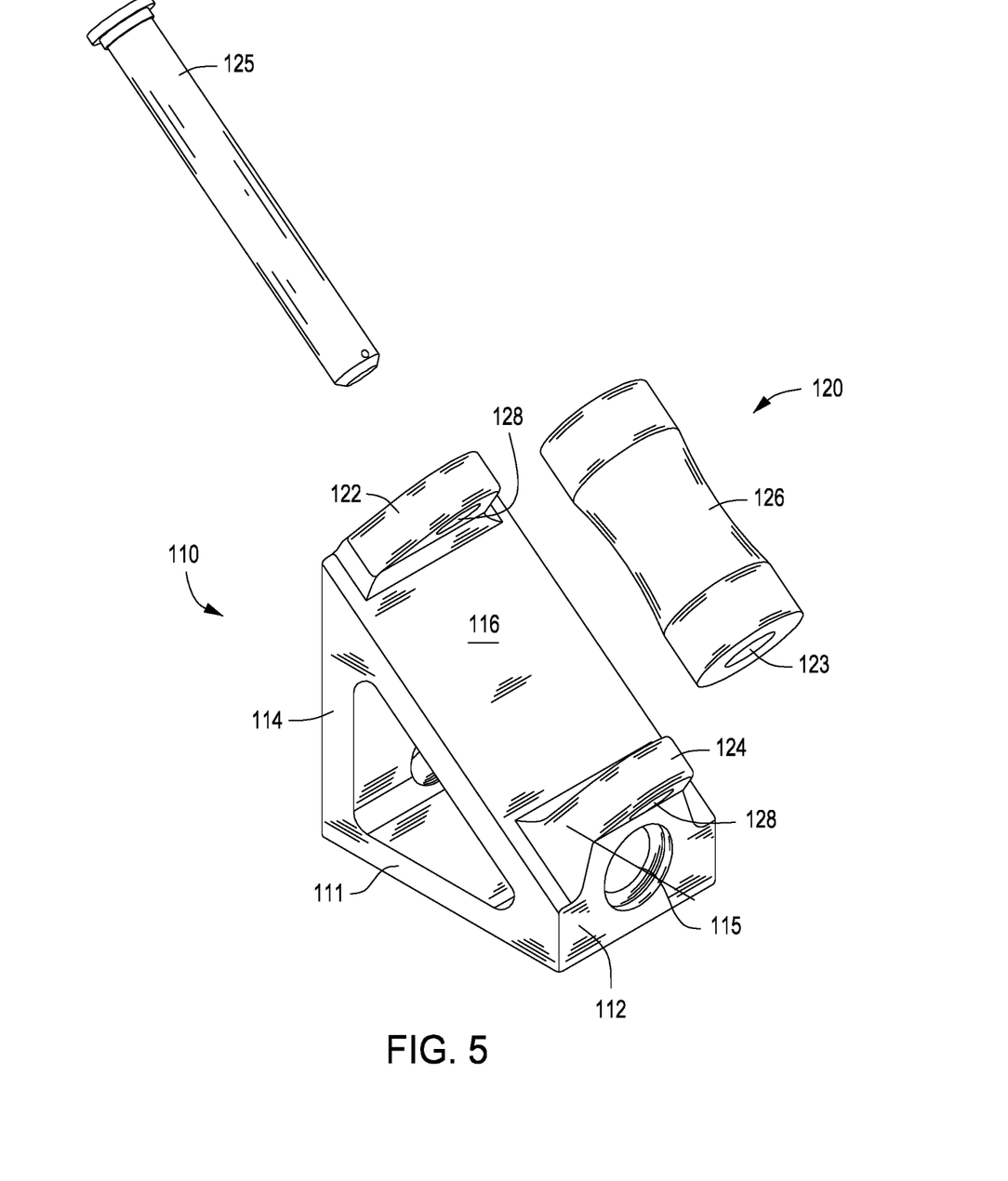
FIG. 5 is an exploded view of the wedge block of FIGS. 3A and 3B.

FIG. 5 is an exploded view of the wedge block 110 of FIGS. 3A and 3B. Here, the relative dimensions of the pin 125 to the roller bearing 120 and the angled face 116 are shown. In addition, holes 128 through the upper 122 and lower 124 supports can be made out. Holes 128 bearingly support the pin 125. A central bore 123 that receives the pin 125 is also shown.

Figure 6:
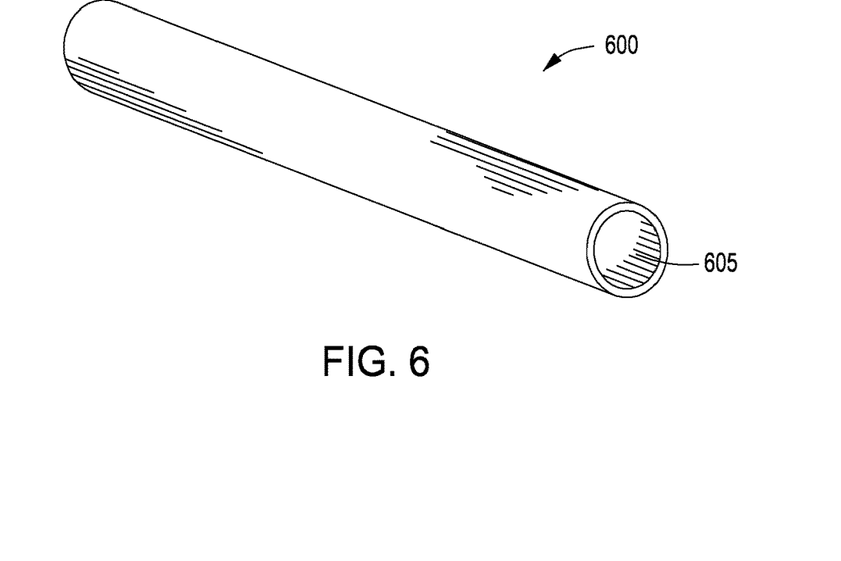
FIG. 6 is a perspective view of a spacer as may be used with the pipe support system of the present invention.

As an additional and optional feature of the pipe support system 100, a spacer may be provided. FIG. 6 is a perspective view of a spacer 600 as may be used with the pipe support system 100 of the present invention. The spacer 600 is a short section of pipe or other tubular body. It is noted that the spacer 600 is also shown at 160 in FIGS. 1A and 1B.

The spacer 600 is dimensioned to reside along the threaded bar 130 intermediate the two wedge blocks 110a, 110b. In this respect, the cylindrical opening (or inner diameter) 605 that extends through the spacer 600 is dimensioned to receive the threaded bar 130. The spacer 600 allows the user to set the overall size of the system 100, thereby making the support structure appropriately sized for different sized pipes.

A mathematical table may be provided to the user, correlating the size of the pipe 200 to the desired spacer 600 length in order to optimize the position of the pipe 200 on the corrugated caps 120. Ideally, the point at which the pipe 200 touches the roller bearings (along concave portion 126) forms a tangent line, meaning that the angle of the tangent line and the angle of the pin 125 is within a few degrees of each other. The mathematical table will inform the user of the needed spacer length to achieve the tangent line. Of course, if the pins 125 are designed to have a different angle, then the spacer lengths on the mathematical table will need to be tweaked. In one aspect, the angle of the pins 120 (and supported roller bearings 120) is between 20° and 40°. More preferably, the angle of the bearings is at 30°.

Figure 7:
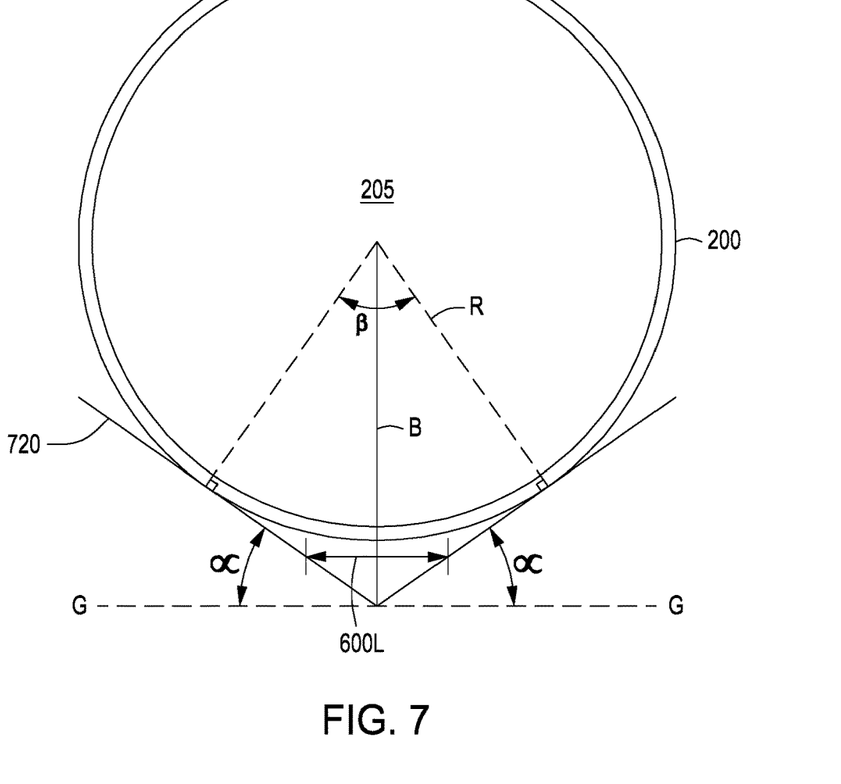
FIG. 7 is a schematic view of a pipe as may be supported by the pipe support system of FIGS. 1A and 1B. Illustrative tangent lines are provided, intended to represent possible orientations of roller bearings.

FIG. 7 is a presentation of a pipe 200 having a radius "R." Two radii lines "R" are indicated. In addition, a pair of tangent lines 720 is shown. The tangent lines 720 correspond to locations and angles of the roller bearings (along concave portion 126), in one embodiment. An angle β is provided to show a separation of the two radii "R" lines.

An additional line "B" is provided. Line B is a vertical line which bisects angle β. Further, a horizontal line 600L is provided, connecting tangent lines 720 and also bisected by line B. Mathematically, line 600L depicts a length of spacer 600. Thus, for a pipe 200 having radius "R", the operator would select a spacer 600 having length 600L.

FIG. 7 also depicts line G-G, in dashed form. Line G-G is an imaginary horizontal line drawn at the point where the two tangent lines 720 would, in theory, intersect if the roller bearings 120 were of sufficient length. The angles γ formed between lines 720 and line G-G are each ½ of angle β.

Using the pipe support system 100 described above, a method of supporting a section of pipe is also provided herein. In one embodiment, the method first comprises providing a pipe support system. The pipe support system may be in accordance with the pipe support system 100 described above in its various embodiments. For example, the pipe support system may include:

a first wedge block and a second wedge block, wherein each of the first and second wedge blocks comprises a base having an inside wall, an outside wall, and an angled face extending there between, wherein the outside wall is taller than the inside wall; and a roller bearing disposed along the angled face of each of the first and second wedge blocks, each roller bearing being oriented at an angle of between 20° and 40°.

The method also includes determining a spacing between the first wedge block and the second wedge block that is needed to support a joint or section of pipe. This determination is based upon the outer diameter of the pipe to be supported. It may also be based on the precise angle of the pins supporting the roller bearings. Preferably, the angle of the pins is at 30°.

The method further includes rotating the threaded bar in order to provide for the determined spacing. The threaded bar may be rotated in a first direction to draw the first and second wedge blocks inward towards each other, and may be rotated in a second opposite direction to allow the first and second wedge blocks to be moved outward from each other. In one aspect, rotating the threaded bar comprises rotating a nut located along the threaded bar relative to the threaded bar.

In a preferred embodiment, the method further comprises selecting a spacer bar of a desired length. The spacer bar defines a cyclindrical body having an inner diameter. The spacer bar resides around the threaded bar between the first wedge block and the second wedge block.

The spacer bar is configured to engage the inside wall of each of the first wedge block and the second wedge block as the threaded bar is rotated to draw the first and second wedge blocks inward towards each other. In this way, the first wedge block and the second wedge block may be spaced apart according to the length of the selected spacer bar. Preferably, the length of the spacer bar is tuned such that when the inside wall of each of the first wedge block and the second wedge block engages a respective end of the space bar, each roller bearing engages the outer diameter of the supported pipe along a tangent line.

In one embodiment, the method includes providing a plurality of the spacer bars, wherein the spacer bars have different lengths. Once again, a length of each of the plurality of spacer bars is tuned such that when the inside wall of each of the first wedge block and the second wedge block engages a respective end of the space bar, each roller bearing engages the outer diameter of the supported pipe along a tangent line. By providing several spacer bars, the operator may adjust the wedge block spacing according to the diameter of the supported pipe.

The method then includes placing the joint or section of pipe onto the pipe support system, thereby supporting the pipe above a ground surface.

With this method, the operator is able to adapt to multiple size of pipes and still utilize the same wedge blocks and roller bearings. This may be done by changing to a spacer having a different length. The length of the spacer is mathematically determined so that when the support is fully tightened together the apex of the pipe falls out in the center of the non-conductive material that the support holds.

Finally, an alternate method of supporting a section of pipe is provided. In one aspect, the method first comprises providing a pipe support system. The pipe support system may be in accordance with the pipe support system 100 described above in its various embodiments. For example, the pipe support system may include:

a first wedge block and a second wedge block, wherein each of the first and second wedge blocks comprises a base having an inside wall, an outside wall, and an angled face extending there between, wherein the outside wall is taller than the inside wall; and a roller bearing disposed along the angled face of each of the first and second wedge blocks, each roller bearing being oriented at an angle of between 20° and 40°.

The method also includes identifying an outer diameter of a joint of pipe to be supported by the pipe support system.

The method further comprises selecting a spacer bar of a desired length. Ideally, the spacer bar is chosen from a collection of spacer bars having different lengths. The length of each of the plurality of spacer bars is tuned such that when the inside wall of each of the first wedge block and the second wedge block engages a respective end of the space bar, each roller bearing engages the outer diameter of the supported pipe along the tangent line.

The method then includes placing the spacer bar between the first wedge block and the second wedge block. Ideally, the spacer bar is a cylindrical body that fits over or covers the threaded bar between the two wedge blocks.

The method also includes linearly translating the first wedge block, the second wedge block, or both in order to engage opposing ends of the spacer bar. Stated another way, the two wedge blocks are squeezed towards each other until they meet the spacer bar. This provides a determined spacing between the first wedge block and the second wedge block in order to support the joint of pipe.

The method further comprises placing the joint or section of pipe onto the pipe support system, thereby supporting the pipe above a ground surface such that the roller bearings contact the outer diameter of the pipe along respective tangent lines.

Preferably, the pipe support system further comprises:
a through-opening through each of the inside wall and the outside wall of each of the first and second wedge blocks, wherein the respective through-openings are aligned;
at least one threaded bar configured to extend through aligned through-openings in each of the first wedge block and the second wedge block;
a pin extending longitudinally through each of the roller bearings;
an upper support extending up from an upper end of each angled face supporting the pin at an upper end of each of the roller bearings; and
a lower support extending up from a lower end of each angled face supporting the pin at a lower end of each of the roller bearings.

In this instance, linearly translating the first wedge block, the second wedge block or both comprises rotating the threaded bar in order to provide for the determined spacing.

In one aspect, rotating the threaded bar comprises rotating a nut located at an end of the threaded bar relative to the threaded bar. Preferably, a nut is disposed at each opposing end of the threaded bar.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application.

In the claims which follow, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

I claim:
1. A pipe support system, comprising:
a first wedge block and a second wedge block, wherein each of the first and second wedge blocks comprises:
a base having an inside wall, an outside wall, and an angled face extending there between, wherein the outside wall is taller than the inside wall; and
a through-opening through each of the inside wall and the outside wall, wherein the respective through-openings are aligned;
a roller bearing disposed along the angled face of each of the first and second wedge blocks, each roller bearing being oriented to face the other at an angle of between 20° and 40° relative to horizontal, and to accommodate thermal expansion and contraction of a joint or section of pipe;
a threaded bar configured to extend through the aligned through-openings in each of the first wedge block and the second wedge block such that a rotation of the threaded bar in a first direction will draw the first and second wedge blocks and respective roller bearings inward towards each other, while rotation of the threaded bar in a second opposite direction will allow the first and second wedge blocks and respective roller bearings to be moved outward from each other;
and wherein each roller bearing has an intermediate concave portion dimensioned to contact the joint Or section of pipe, and the roller bearings are adjustably spaced apart in order to support the joint or section of pipe within the concave portion.

2. The pipe support system of claim 1, wherein each of the first wedge block and the second wedge block further comprise:
a pin extending longitudinally through a respective roller bearing;
an upper support extending up from an upper end of the angled face of each of the first and second wedge blocks, supporting the pin at an upper end of the roller bearing; and
a lower support extending up from a lower end of the angled face of each of the first and second wedge blocks, supporting the pin at a lower end of the roller bearing.

3. The pipe support system of claim 2, further comprising:
a spacer bar configured to engage the inside wall of each of the first wedge block and the second wedge block as the threaded bar is rotated to draw the first and second wedge blocks and respective roller bearings inward towards each other, thereby spacing the first wedge block and the second wedge block apart according to a length of the spacer bar.

4. The pipe support system of claim 3, wherein the length of the spacer bar is dimensioned such that when the inside wall of each of the first wedge block and the second wedge block engages a respective end of the spacer bar, each roller bearing will engage the outer diameter of a pipe to be supported along a tangent line.

5. The pipe support system of claim 4, wherein:
the spacer bar defines a cylindrical body having an inner diameter; and
the spacer bar resides around the threaded bar between the first wedge block and the second wedge block.

6. The pipe support system of claim 2, further comprising:
a plurality of spacer bars having different lengths, each spacer bar being configured to engage the inside wall of each of the first wedge block and the second wedge block as the threaded bar is rotated to draw the first and second wedge blocks and respective roller bearings inward towards each other, thereby spacing the first wedge block and the second wedge block apart according to the length of a selected spacer bar.

7. The pipe support system of claim 6, wherein the length of each of the plurality of spacer bars is tuned such that when the inside wall of each of the first wedge block and the second wedge block engages a respective end of the spacer bar, each roller bearing will engage the outer diameter of a pipe to be supported along a tangent line.

8. The pipe support system of claim 4, further comprising:
a base plate;
a first anchor secured to the base plate at a first location and having an end plate, the end plate comprising a through-opening dimensioned to receive a first end of the threaded bar; and
a second anchor secured to the base place at a second location and also having an end plate, wherein the end plate of the second anchor has a through-opening that is dimensioned to receive a second end of the threaded bar;
wherein the end plate of the first anchor is positioned to engage the outside wall of the first wedge block as a stop, and the end plate of the second anchor is positioned to engage the outside wall of the second wedge block as a stop, thereby limiting ultimate movement of the first and second wedge blocks away from each other when the threaded bar is in place within the through-openings of the first and second anchors.

9. The pipe support system of claim 8, wherein the through-openings of the first and second wedge blocks and the through-openings of the first and second anchors are aligned to hold the threaded bar on the base plate.

10. The pipe support system of claim 9, further comprising:
a nut threadedly secured onto an end of the threaded bar; and wherein the nut abuts an outer surface of the end plate of the first anchor.

11. The pipe support system of claim 9, wherein each of the first and second roller bearings is fabricated from a non-conductive material.

12. The pipe support system of claim 11, wherein the non-conductive material comprises polyurethane, nylon or combinations thereof.

13. A method of supporting a section of pipe, comprising:
providing a pipe support system, comprising:
a first wedge block and a second wedge block, wherein each of the first and second wedge blocks comprises a base having an inside wall, an outside wall, and an angled face extending there between, wherein the outside wall is taller than the inside wall;
a roller bearing disposed along the angled face of each of the first and second wedge blocks, each roller bearing being oriented to face the other at an angle of between 20° and 40° relative to horizontal, and each roller bearing having an intermediate concave portion; and
a through-opening through each of the inside wall and the outside wall of each of the first and second wedge blocks, wherein the respective through-openings are aligned; and
a threaded bar configured to extend through the aligned through-openings in each of the first wedge block and the second wedge block;
determining a spacing between the first wedge block and the second wedge block in order to support a joint or section of pipe having an outer diameter;
rotating the threaded bar in order to provide for the determined spacing; and
placing the joint or section of pipe onto the pipe support system wherein the concave portion of the roller bearings contacts the pipe, thereby supporting the pipe above a ground surface.

14. The method of claim 13, wherein the threaded bar may be rotated in a first direction to draw the first and second wedge blocks inward towards each other, and may be rotated in a second opposite direction to allow the first and second wedge blocks to be moved outward from each other.

15. The method of claim 14, wherein rotating the threaded bar comprises rotating a nut located at an end of the threaded bar relative to the threaded bar.

16. The method of claim 14, wherein each of the first wedge block and the second wedge block further comprises:
a pin extending longitudinally through each of the roller bearings;
an upper support extending up from an upper end of the angled face of each of the wedge blocks, supporting the pin at an upper end of the roller bearing; and
a lower support extending up from a lower end of the angled face of each of the wedge blocks, supporting the pin at a lower end of the roller bearing.

17. The method of claim 16, further comprising:
selecting a spacer bar of a desired length, wherein the spacer bar is configured to engage the inside wall of each of the first wedge block and the second wedge block as the threaded bar is rotated to draw the first and second wedge blocks and respective roller bearings inward towards each other, thereby spacing the first wedge block and the second wedge block apart according to the length of the selected spacer bar.

18. The method of claim 17, wherein the length of the spacer bar is dimensioned such that when the inside wall of each of the first wedge block and the second wedge block engages a respective end of the spacer bar, each roller bearing engages the outer diameter of the supported pipe along a tangent line.

19. The method of claim 18, wherein:
the spacer bar defines a cylindrical body having an inner diameter; and
the spacer bar receives the threaded bar within the inner diameter between the first wedge block and the second wedge block.

20. The method of claim 16, further comprising:
providing a plurality of spacer bars having different lengths, each spacer bar being configured to engage the inside wall of each of the first wedge block and the second wedge block as the threaded bar is rotated to draw the first and second wedge blocks and respective roller bearings inward towards each other, thereby spacing the first wedge block and the second wedge block apart according to the length of a selected spacer bar.

21. The method of claim 20, wherein a length of each of the plurality of spacer bars is dimensioned such that when the inside wall of each of the first wedge block and the second wedge block engages a respective end of the spacer bar, each roller bearing engages the outer diameter of the supported pipe along a tangent line.

22. The method of claim 21, wherein the pipe support system further comprises:
a base plate;
a first anchor secured to the base plate at a first location and having an end plate, the end plate comprising a through-opening dimensioned to receive a first end of the threaded bar; and
a second anchor secured to the base place at a second location and also having an end plate, wherein the end plate of the second anchor has a through-opening that is dimensioned to receive a second end of the threaded bar;
wherein the end plate of the first anchor is positioned to engage the outside wall of the first wedge block as a stop, and the end plate of the second anchor is positioned to engage the outside wall of the second wedge block as a stop, thereby limiting ultimate movement of the first and second wedge blocks away from each other when the threaded bar is in place within the through-openings of the first and second anchors.

23. The method of claim 22, wherein:
the through-openings of the first and second wedge blocks and the through-openings of the first and second anchors are aligned to hold the threaded bar on the base plate; and
rotating the threaded bar comprises rotating a nut located at an end of each of the threaded bars relative to the threaded bar.

24. A method of supporting a section of pipe, comprising:
providing a pipe support system, comprising:
a first wedge block and a second wedge block, wherein each of the first and second wedge blocks comprises a base having an inside wall, an outside wall, and an angled face extending there between, wherein the outside wall is taller than the inside wall; and
a roller bearing disposed along the angled face of each of the first and second wedge blocks, each roller bearing facing the other and being oriented at an angle of between 20° and 40° relative to horizontal;
identifying an outer diameter of a joint of pipe to be supported by the pipe support system;
selecting a spacer bar of a desired length;
placing the spacer bar between the first wedge block and the second wedge block;
linearly translating the first wedge block, the second wedge block, or both in order to engage opposing ends of the spacer bar, and thereby providing a determined spacing between the first wedge block and the second wedge block in order to support the joint of pipe; and
placing the joint or section of pipe onto the pipe support system, thereby supporting the pipe above a ground surface such that the roller bearings contact the outer diameter of the pipe along respective tangent lines.

25. The method of claim 24, wherein the pipe support system further comprises:
a through-opening through each of the inside wall and the outside wall of each of the first and second wedge blocks, wherein the respective through-openings are aligned;
at least one threaded bar configured to extend through the aligned through-openings in each of the first wedge block and the second wedge block;
a pin extending longitudinally through each of the roller bearings;
an upper support extending up from an upper end of each angled face supporting the pin at an upper end of each of the roller bearings; and
a lower support extending up from a lower end of each angled face supporting the pin at a lower end of each of the roller bearings.

26. The method of claim 25, wherein linearly translating the first wedge block, the second wedge block or both comprises rotating the threaded bar in order to provide for the determined spacing.

27. The method of claim 26, wherein rotating the threaded bar comprises rotating a nut located at an end of the threaded bar relative to the threaded bar.

28. The method of claim 26, wherein:
the spacer bar defines a cylindrical body having an inner diameter; and
the spacer bar resides around the threaded bar between the first wedge block and the second wedge block.

29. The method of claim 28, further comprising:
providing a plurality of spacer bars having different lengths, each spacer bar being configured to engage the inside wall of each of the first wedge block and the second wedge block as the threaded bar is rotated to draw the first and second wedge blocks and respective roller bearings inward towards each other, thereby spacing the first wedge block and the second wedge block apart according to a length of a selected spacer bar;
and wherein the length of each of the plurality of spacer bars is tuned such that when the inside wall of each of the first wedge block and the second wedge block engages a respective end of the spacer bar, each roller bearing engages the outer diameter of the supported pipe along the tangent line.

30. The method of claim 28, wherein each roller bearing comprises an intermediate concave portion dimensioned to closely receive the joint of pipe when the first wedge block and the second wedge block engage the opposing ends of the spacer bar.

* * * * *